Patented Oct. 31, 1933

1,933,049

UNITED STATES PATENT OFFICE 1,933,049

PREPARATION OF COFFEE EXTRACT

Louis G. Copes, Bayonne, N. J., assignor to The Best Foods, Inc., New York, N. Y., a corporation of New Jersey No Drawing. Application October 3, 1929
Serial No. 397,152

3 Claims. (Cl. 99—11)

This invention relates to the preparation of a food product and more particularly to a process for producing a soluble extract of coffee.

In the process ordinarily used in making coffee extracts, the product obtained is of inferior quality because of the reduction in the aromatic quality of the roasted coffee resulting from the evaporation employed to concentrate the coffee infusion to a dry or concentrated product.

It is an object of this invention to overcome this difficulty and to provide a process by which there may be produced a concentrated coffee extract containing the aromatic properties of the roasted coffee bean. A further object is to produce an extract of raw coffee bean which can subsequently be converted into a form in which it can be used in making the familiar coffee liquid. Another object is to provide a roasted extract of coffee bean which may be redissolved to produce a coffee liquid. Other objects will become apparent.

To accomplish these improved results I grind or roll the raw coffee bean and extract the desired portion with a suitable solvent or mixture of solvents. This extract is then evaporated to dryness, the residue is roasted and the resulting material may be ground to a powder which may be used in the preparation of liquid coffee.

As a specific example of my improved process the raw coffee bean is ground to a more or less fine powder. To about 100 grams of this powder is added 200 grams of cold water and the mixture may be allowed to stand for about twelve hours after which the liquid may be pressed out by a suitable press. The residue from the press may then be treated with 100 grams of boiling water and allowed to stand for about 10 minutes. The mass is again pressed and the second step of the process may be repeated. The liquids obtained by pressing the above mixtures after the several macerations, may be mixed together and evaporated, either in a vacuum or at atmospheric pressure. The anhydrous residue is then roasted at a suitable temperature to produce the desired aromatic quality, for example it may be roasted at about 400 to 420 degrees Fahrenheit for a period of twenty to thirty minutes. This roasting may be done in the open air or in a closed container, and either under pressure, without pressure, or in a vacuum. The mixture resulting from this roasting is then ground to a powder and may be redissolved in a suitable quantity of water to give a mixture comparable with a fresh coffee extract made from the roasted bean.

It is apparent that many modifications of the above procedure may be used, the liquid used to extract the desired portion of the raw coffee bean may be water or some other suitable solvent or mixture of solvents. Furthermore, several successive extractions may be made by using different solvents, for example, the first extraction may be with water and this may be followed by one with alcohol, each extraction being followed by washings with the same solvent or with a different solvent or mixture of solvents.

The extraction of the desired portion of the crushed or powdered raw coffee bean may be accomplished by maceration of the material in the solvent or by percolation of the solvent through the material and the solvent used in the extraction may be drained from the residue or it may be separated by some other suitable means such as centrifugal means or by pressing.

The temperature of the solvent during extraction may be varied to give the desired results. For instance, if desired the extraction may be entirely accomplished with cold solvent or by a succession of washings at different temperatures.

It is apparent also that materials other than coffee may be treated in a similar manner. For example, chickory or other cereal or leguminous products sometimes used for making coffee substitutes, may be treated as I have described. This process may also be applied to mixtures of raw coffee with other cereals or leguminous products. The temperature and time of roasting may also be varied to give the desired results.

The dry roasted extract may be marketed as such, or it may be redissolved in a small amount of water or other suitable solvent to make a concentrated liquid extract which may be subsequently diluted to produce a beverage or which may be used as a flavoring extract. A preservative may be added to this liquid to prevent deterioration and the formation of molds. The dry powder may also be mixed with other organic food materials such as maltose to produce a special type of coffee, or it may be mixed with a tasteless inert material, such as milk sugar to prevent caking and to promote rapid solution. The concentrate itself or a mixture of the concentrate with another ingredient, either inert or otherwise, could also be formed into tablets.

The concentrated extract of the raw bean may be transported to the vicinity in which it is to be used and may then be evaporated to dryness and roasted. To accomplish this it may be considered advisable to put the liquid in cans in accordance with an ordinary sterilizing process used in preserving food products. The solid residue from the evaporation may also be transported and marketed and may be roasted when needed. If desired this dry unroasted powder may be mixed with other food products and subsequently roasted.

It is apparent that many modifications and applications of my invention may be made and it is not intended to hereby limit it to the particular embodiment disclosed.

What I claim is:

1. A process for preparing concentrated coffee comprising crushing the raw coffee bean and extracting it with cold water, evaporating the extract to dryness and roasting the residue.

2. A process for preparing concentrated coffee, comprising crushing the raw coffee bean, extracting it with about twice its weight of cold water for about twelve hours and subsequently extracting it with about an equal weight of boiling water for about ten minutes, evaporating the extracts and roasting the combined residues to obtain the desired coffee flavor.

3. A process for preparing concentrated coffee comprising crushing the raw coffee bean, extracting it first with cold water and then for a short time with hot water, combining the extracts and evaporating them to dryness and roasting the residue.

LOUIS G. COPES.